July 24, 1962  J. F. VAN HOOZER  3,046,091
PREPARATION OF ALKALI METAL DICHROMATE
Filed Dec. 19, 1958
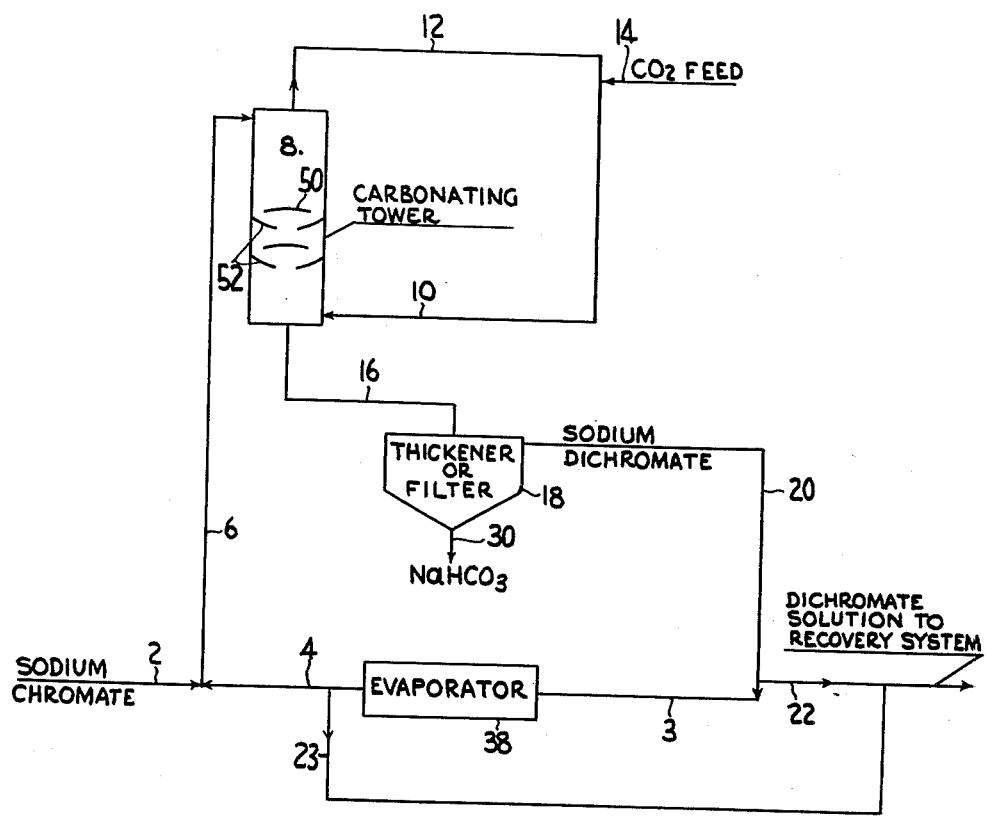
INVENTOR.
JOHN F. VAN HOOZER
BY Oscar L. Spencer
ATTORNEY United States Patent Office 3,046,091
Patented July 24, 1962

3,046,091
PREPARATION OF ALKALI METAL DICHROMATE
John F. Van Hoozer, Corpus Christi, Tex., assignor, by mesne assignments, to Pittsburgh Plate Glass Company
Filed Dec. 19, 1958, Ser. No. 781,496
5 Claims. (Cl. 23—56)

This invention relates to a method of preparing sodium dichromate. Conventionally, the production of sodium dichromate has been effected using chromite ore as the raw material. The chromite ore, which has the approximate composition $FeOCr_2O_3$, normally is heated with soda ash or potassium carbonate, with consequent formation of sodium or potassium chromate. The resulting sodium or potassium chromate is extracted from the calcined mixture and the chromate solution thus produced is reacted with acid to convert the monochromate solution to dichromate. In most cases, this acid has been sulphuric acid.

In a few cases, carbon dioxide has been used as the acid for conversion of the alkali metal chromate to alkali metal dichromate. Two difficulties are encountered. First, the reaction has been incomplete and, second, the rate of reaction is relatively slow.

The degree of conversion may be improved by introducing carbon dioxide into a sodium chromate solution in which the $CrO_3$ content is above that equivalent to the $CrO_3$ content of a saturated aqueous sodium chromate solution. Thus, 85 to 90 percent or more of the dissolved chromium in aqueous solution may be converted to dichromate by mixing the solution with a more concentrated sodium dichromate solution to provide an aqueous chromate-dichromate solution containing at least 35 percent, and preferably 40 percent or more, by weight of $CrO_3$, and carbonating such solutions.

According to the present invention, it has been found that the rate of this reaction may be appreciably increased by introducing the carbon dioxide into the chromate solution at a rate at least twice, and preferably four or more times, the rate at which the carbon dioxide introduced is absorbed. This process is especially effective when the carbonation of the chromate solution is conducted in a plurality of stages, as in a tower wherein a pool of the aqueous chromate solution is divided into a plurality of superimposed sections by means of plates with bubble caps or the like. In such a case, the carbon dioxide is introduced into the bottom of the tower (i.e., the first carbonation stage, and passes upwardly through a plurality of stages to the top of the tower. Unabsorbed carbon dioxide is collected at the top of the tower and is recycled, together with fresh or make-up carbon dioxide, to the tower bottom. The amount of such recycle is at least equal to and preferably exceeds three times the amount of carbon dioxide absorbed or introduced as make-up.

In the normal practice of the process as herein contemplated, an aqueous solution of sodium monochromate is prepared by leaching the calcined mixture of sodium carbonate and chromite ore which is produced according to conventional methods. The leaching and concentration of the leached solution is normally conducted in a manner such as to produce a saturated or near saturated solution, usually containing in excess of 40 percent by weight of sodium chromate. Thereafter, this sodium monochromate solution is mixed with an aqueous solution of sodium dichromate which contains a higher $CrO_3$ concentration than does the monochromate solution.

The resulting mixed solution is then subjected to the action of carbon dioxide at a superatmospheric pressure by convenient means, such as by countercurrent contact in a tower or column. This produces an aqueous slurry of precipitated sodium bicarbonate and a solution of sodium dichromate in which well above 85 percent, usually in the range of 90 to 95 percent, by weight of the dissolved chromium has been converted to dichromate. The dichromate solution is then recovered and a portion thereof is concentrated to a concentration above about 35 percent by weight of $CrO_3$ and is recycled for mixing with further sodium monochromate solution.

The accompanying drawing diagrammatically illustrates the manner in which the process may be performed. As therein shown, an aqueous stream of sodium monochromate solution containing in excess of 40 percent by weight of sodium chromate is fed continuously through line 2 and is mixed with an aqueous solution of sodium dichromate flowing continuously through line 4 and containing $CrO_3$ content higher than that contained in the sodium chromate solution. Normally, the dichromate content of the solution flowing through line 4 is equivalent to at least 35 percent by weight of $CrO_3$.

The resulting mixture is transmitted through line 6 to the top of the carbonating tower 8 where it is contacted countercurrently with carbon dioxide (either in a pure state or diluted with gaseous diluents, such as are commonly present in flue gas) which enters the tower through line 10. The carbon dioxide, usually under a partial pressure in excess of 15 pounds per square inch absolute, is fed at a rate faster than it is absorbed, and the gas escaping from the top of the tower is returned through line 12 to line 10. Fresh carbon dioxide is mixed with the recycling carbon dioxide being fed through line 14.

To effect the carbonation in a plurality of stages, a plurality of plates or like dividers are disposed in the tower 8. Each of these plates comprises a disc section 52 extending inwardly from the tower wall and providing a central opening which is covered by a cap section 50 which may advantageously have a serrated edge.

The carbon dioxide introduced into the tower thus is collected in the central area by the plate and is delivered to a point close to the tower wall above the plate. Solution coming into the top of the tower passes outward from the center over the top of cap 50 and falls onto disc section 52 which delivers the solution to the central area of the tower at a point below the plate. By use of a plurality of plates, normally in the lower half of the tower, a plurality of carbonation stages are provided.

The result is to produce a slurry of solid sodium bicarbonate suspended in an aqueous solution of sodium dichlromate which contains a small concentration of sodium chromate. This slurry is discharged from the bottom of the tower through line 16 and is delivered to a filter 18 or a thickener operating under pressure where the solution is separated from the sodium bicarbonate. The sodium bicarbonate is withdrawn from the bottom of the thickener through line 30 and is processed by conventional means. The aqueous dichromate solution is withdrawn from the filter through line 20.

A portion of the dichromate solution is sent forward through line 22 to a conventional recovery system. If desired, this stream may be withdrawn, after evaporation or concentration of the solution, through line 23.

Another portion of the dichromate solution is recycled through line 3 to an evaporator 38 to concentrate the dichromate solution to a $CrO_3$ content above about 35 percent by weight, and the concentrated solution is recycled through line 4 for mixing with further sodium chromate.

By performance of the process as described above, it is possible to effect the desired high conversion of chromate to dichromate in a single pass and without precipitation of dichromate during the course of the carbonation. This is desirable since, if the dichromate is precipitated, its separation from the solid precipitated sodium bicarbonate requires further operations which add to the general expense of the process.

The following are typical examples:

EXAMPLE I

A substantially saturated aqueous sodium chromate solution containing about 50 percent by weight of sodium chromate was mixed with an aqueous solution containing about 57 percent by weight of dichromate and 6 percent by weight of sodium chromate. This mixture was used as a feed to a carbonating tower, and the feed thus produced contained about 43.1 percent $CrO_3$ as sodium chromate and dichromate, the sodium chromate concentration being 25 percent by weight. This feed was fed continuously to a tower 20 feet high and one foot in diameter. Carbon dioxide was introduced into the base of the tower more rapidly than it was absorbed, and the unreacted carbon dioxide was collected and recycled, as shown in the drawing.

To initiate the process, the tower was filled with the feed liquor to a depth of 13 feet, and the liquor was fed to the top of the tower and withdrawn from the bottom of the tower at the rate of 11.1 gallons per hour. Carbon dioxide was introduced into the tower fast enough to establish and maintain a carbon dioxide pressure of 125 pounds per square inch gauge at the top of the tower, using substantially pure carbon dioxide fed into the bottom of the tower. The carbon dioxide which was undissolved was collected from the top of the tower and mixed with enough fresh carbon dioxide to make up for that consumed, and the mixture was recycled. The carbon dioxide was fed into the bottom of the tower at the rate of about 200 pounds per hour, and make-up carbon dioxide was added to the recycling carbon dioxide at a rate of 20 pounds per hour. The time of retention of the liquid within the column was about 8.2 hours. The feed of liquor under these conditions was continued over a period of 24 hours, the total $CrO_3$ content of the liquor ranging from 42.8 to 43.0 percent by weight.

The sodium chromate content of the liquor withdrawn from the bottom of the column ranged from 5.7 to 5.0 percent by weight, thus indicating that 91.5 to 92.6 percent of the chromium in solution was present as dichromate. The temperature of the column during this period of treatment was maintained at 40° C. at the top thereof and 30° C. at the bottom.

EXAMPLE II

Using the tower of Example I filled to a depth of 13 feet, the rate of conversion of chromate to dichromate was measured by introducing pure carbon dioxide into the bottom of the tower and recycling unabsorbed carbon dioxide, as in Example I, at various rates of recycle of carbon dioxide to the bottom of the tower. The average rate of conversion of chromate to dichromate was determined at a time where the average sodium chromate concentration was 5 percent by weight of the solution.

The following table summarizes the results obtained:

Table I

USING EMPTY TOWER

| Gauge Pressure at top of Tower, Pounds per square inch | Recycle rate, pounds of carbon dioxide recycled per hour | Total flow rate of carbon dioxide introduced into the bottom of the tower, pounds of $CO_2$ per hour | Moles of chromate converted to dichromate per hour |
|---|---|---|---|
| 50 | 15 | 35 | 0.031 |
| 50 | 50 | 70 | 0.037 |
| 50 | 85 | 105 | 0.053 |
| 50 | 60 | 80 | 0.056 |
| 125 | 125 | 145 | 0.056 |
| 125 | 205 | 225 | 0.10 |

USING PLATES WITH SERRATED EDGES

| | | | |
|---|---|---|---|
| 50 | 50 | 70 | 0.080 |
| 50 | 85 | 105 | 0.114 |
| 50 | 125 | 145 | 0.126 |
| 125 | 125 | 145 | 0.169 |
| 125 | 205 | 225 | 0.194 |

As shown in the above examples, a large amount of carbon dioxide is recycled. Usually, the amount unabsorbed but collected on the top of the tower and recycled is at least twice the amount of carbon dioxide absorbed.

While the process has been described with reference to its application to sodium chromate, other alkali metal chromates, such as potassium dichromate, may be treated in like manner.

Although the present invention has been described with reference to the specific details of certain embodiments, it is not intended that such details shall be regarded as limitations upon the scope of the invention except insofar as included in the accompanying claims.

What is claimed:

1. A method of preparing alkali metal dichromate which comprises countercurrently contacting alkali metal chromate with carbon dioxide in a plurality of intercommunicating superimposed stages in a tower, introducing carbon dioxide into the lowermost of said stages, introducing an aqueous solution of alkali metal chromate containing at least 35 percent by weight of $CrO_3$ into the uppermost of said stages, withdrawing alkali metal dichromate from the lowermost of said stages, and feeding the carbon dioxide into the lowermost of said stages at a rate at least twice the rate at which the carbon dioxide is absorbed in all of said stages.

2. The process of claim 1 wherein the rate of introduction of carbon dioxide is at least four times the rate at which carbon dioxide is absorbed.

3. A method of preparing alkali metal dichromate which comprises countercurrently contacting alkali metal chromate with carbon dioxide in a plurality of superimposed stages, introducing carbon dioxide into the lowermost of said stages in a tower, introducing an aqueous solution of alkali metal chromate at least 35 percent by weight $CrO_3$ into the uppermost of said stages, withdrawing alkali metal dichromate from the lowermost of said stages, feeding the carbon dioxide into the lowermost of said stages at a rate at least twice the rate at which the carbon dioxide is absorbed in all of said stages, collecting unabsorbed carbon dioxide escaping from the uppermost stage, recycling the collected carbon dioxide to the bottom through the lowermost stage, and introducing fresh carbon dioxide into said lowermost stage.

4. The process according to claim 1 wherein the alkali metal is sodium.

5. The process of claim 3 wherein the amount of carbon dioxide recycled is at least three times the amount of fresh carbon dioxide introduced into the lowermost stage.

References Cited in the file of this patent

UNITED STATES PATENTS 2,027,477    Hackhofer _____ Jan. 14, 1936

2,931,704    Hoekje _____ Apr. 5, 1960

OTHER REFERENCES

Fiat Final Report No. 796, "Bichromates Manufacture," April 18, 1947 (release date), 55 pages.